June 14, 1960     H. J. BUTLER     2,940,544
BRAKING SYSTEMS
Filed Oct. 22, 1957
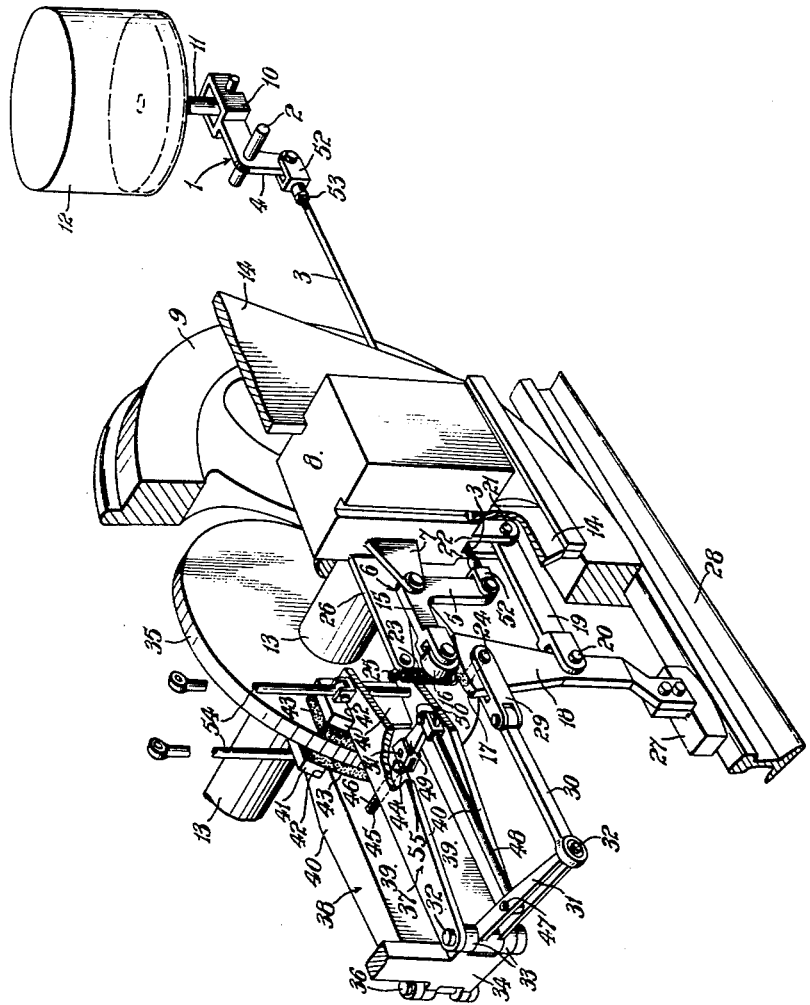
INVENTOR
Henry James Butler
by Benj. T. Rauber
his attorney `United States Patent Office`

2,940,544
Patented June 14, 1960

2,940,544

BRAKING SYSTEMS

Henry James Butler, Sutton Coldfield, England, assignor to Dunlop Rubber Company Limited, London County, England, a British company Filed Oct. 22, 1957, Ser. No. 691,618

Claims priority, application Great Britain Oct. 27, 1956

8 Claims. (Cl. 188—33)

This invention relates to vehicle braking systems and more particularly relates to braking systems for railway vehicles and like rolling stock.

The conventional "clasp" brake used for rolling stock, comprising a pair of cast-iron brake shoes adapted to be forced into frictional engagement with the steel rolling surface of the wheel, has certain disadvantages, amongst them being its relative inefficiency and the need for frequent renewal of the cast-iron brake shoes. On the other hand it possesses the advantage that the cast-iron shoes engaging with the wheel to a large extent simulate the frictional characteristics obtaining between the wheel and the rail, thus relating the actual braking to the wheel adhesion existing during varying climatic and other conditions.

The object of the present invention is to provide an improved braking system for railway vehicles.

According to the present invention a braking system for railway vehicles comprises a friction device adapted to frictionally engage a rail and to be moved by said frictional engagement in a direction opposite to that of the vehicle movement, means to effect said frictional engagement and means actuated by movement of said friction device to operate a main brake, wherein the extent of the movement of said device, caused by the amount of friction between it and said rail, determines the degree of braking effected by the main brake.

The means to force the friction device into contact with the rail preferably comprises the normal brake applying means, which may be vacuum or pressure operated. On such contact being effected a member associated with the friction device is moved and this movement applies a known type of disc brake which is preferably associated with the live axle intermediate the wheels. Movement of the member, which decides the degree of braking to be effected at the disc brake, is determined largely by the downward force on said member effected through the vacuum or pressure means, the coefficient of friction obtaining between the rail and the friction device and the speed of the vehicle.

But a better understanding of the invention may be obtained from the following description when this is read with reference to the accompanying drawing which is a perspective view, partly in section, of one embodiment of the invention as applied to a railway vehicle.

As shown in the drawing, a braking system for a railway wagon comprises a bell crank lever 1 angularly movable about a fulcrum 2 secured to the body of the vehicle to tension a pull rod 3 which is secured at one end to one arm 4 of said bell crank lever 1 and at the other end to the end of one arm 5 of a second bell crank lever 6 which is pivoted to an ear 7 secured to the axle box 8 of a rail wheel 9. The bell crank lever 1 has its arm 10 operably linked in the known manner to the piston rod 11 of a vacuum piston and cylinder mechanism 12.

The axle box 8, which locates one end of the live axle 13 to which a pair of wheels 9 is secured, is mounted for vertical movement in a bracket 14, the upper end of which is secured to the frame of the vehicle and the customary semi-elliptic leaf spring (not shown) is interposed between the axle box and the frame in the known manner. The end of the other arm 15 of the bell crank lever 6 is provided with a roller 16 which bears on the arcuate upper end 17 of a substantially-vertical member 18 which is pivotally connected with the axle box 8 by a link 19 pivotally connected at one end to the member 18 by a pivot 20 intermediate its ends, and at the other end to a pivot 21 passed between a pair of depending ears 22 secured to the axle box 8. A helical tension spring 23 is fitted under tension between a pivot pin 24 located in the member 18 adjacent the arcuate surface 17 thereon and a peg 25 located in the free end of a horizontal bracket 26 secured to the side of the axle box 8 adjacent the bracket 7. The spring 23 is adapted to bias said member 18 in a vertically-upwards direction and to normally maintain it in a substantially-vertical position.

A cast-iron shoe 27 is detachably secured to the lower end of the vertical member 18 and is adapted to be pressed into engagement with the upper surface of a rail 28, from which it is normally vertically-spaced a short distance. Pivoted on the pivot pin 24 at the upper end of the vertical member 18 is a clevis 29 to the free end of which is pivoted a horizontal link 30 which extends away from the axle box 8 longitudinally of the vehicle and has its other end mounted for universal movement on the adjacent end of a lever 31 as by a ball, or other universal pivot 32. The other end of the lever 31 is pivoted for movement in a horizontal plane on a vertical pivot pin 32 passed between ears 33 extending from a vertical bracket 34 secured to a rigid portion of the frame of the vehicle in any suitable manner.

The brake is a disc brake and comprises an annular disc 35 rotatable with the live axle 13 and secured to the axle between the wheels 9 at each end thereof. The bracket 34 extends downwardly from the frame of the vehicle, as previously stated, and on the pivot pin 32, and a similar pin 36 parallelly-spaced therefrom, two pincer arms 37, 38 are pivoted for movement in a horizontal plane. The arms 37, 38 each extend towards the disc 35, one on each side thereof, the ends remote from the pivot pins 32, 36 overlapping the periphery of the disc and extending radially-inwardly thereof over a substantial portion of its radial depth. To provide substantial strength to the arms 37, 38 without making them unduly heavy, they are of channel section with the webs 39 of each channel lying vertically adjacent to each other and to the disc 35 and the limbs 40 of the channel directed away from the disc. The limbs 40 are suitably tapered towards each end to remove excess metal not contributing towards the strength of the arms.

Towards the end of each arm 37, 38 where it overlaps the periphery of the disc 35, and on the side thereof adjacent the disc, a pressure plate 41 is secured in a recess 42 formed by removing the web 39 at these points, and to the face of each pressure plate 41 lying adjacent the disc 35 is secured a pad 43 of friction material in such a manner that pivoting together of the arms 37, 38 will cause the pads 43 to be pressed against the respective radial faces of the disc 35.

Co-axial holes 44, 45 are formed in the webs 39 of the arms 37, 38 in a position lying adjacent, but clear of, the periphery of the disc 35, the hole 44 being of greater diameter than the hole 45, so that an eye-bolt 46 may be passed loosely through the hole 44 and snugly through the hole 45. The bolt 46 is threaded at the end which passes through the hole 45 and is secured against axial withdrawal therefrom by suitable locking means (not shown) such as a nut and locknut screwed against the face of the web 39 between the limbs 40 thereof.

Pivoted in the lever 31 on a vertical pivot pin 47 passed therethrough intermediate its ends is a horizontal rod 48 which extends towards the disc 35, parallel with the link 30, to a position in axial alignment with the eye-bolt 46, and a double-acting cam lever 49 is pivoted on a pin 50 passed vertically through a clevis secured to the end of the rod 48. The other end of the cam lever 49 is bifurcated so that the eye of the eye-bolt 46 may be pivoted between the bifurcations on a pin 51 passed vertically therethrough, the double cam surface 55 lying adjacent the web 39 of the pincer arm 37.

The threaded portion of the eye bolt 46 is preferably extended for a substantial distance along the stem of the bolt so that the separation of the arms 37, 38 may be adjusted to maintain the friction surfaces of the pads 43 at a predetermined distance from the adjacent radial surface of the disc 35, whereby the pads may be adjusted as wear takes place.

Provision may also be made for adjustment of the pull rod 3 to vary the angular position of the ball crank 6 so that the shoe 27 may be maintained at a predetermined distance above the rail 28 regardless of wear in the said shoe. This adjustment may conveniently be provided by screw-threading the rod 3 into the clevises 52 at each end thereof, and to permit this adjustment without removal of the rod the screw-thread at the opposite ends may be of right-hand and left-hand pitch, respectively, a lock nut 53 being provided to retain the rod in its adjusted position.

To hold the pincer arms 37, 38 in their horizontal position without strain on the pins 32 and 36, and to support the pad-bearing ends of the arms against the angular forces imposed thereon by the frictional engagement of the friction pads with the rotating disc, the arms 37, 38 are each linked to the body of the vehicle by hanger rods, or stay rods 54, each of which is pivoted at one end to the respective arm 37 or 38, and at its other end to an unsprung part of the body of the vehicle.

The brake operates with equal efficiency, and in substantially the same way, regardless of the direction in which the vehicle is travelling.

Assuming that the vehicle is travelling to the left as shown in the drawing, actuation of the vacuum cylinder 12, in the normal manner, to apply the vehicle brakes, will cause the piston therein to move towards the upper end of the cylinder, drawing the piston rod 11 upwards and rotating the bell crank 1 about its pivot 2 to exert a pull on the rod 3. The shoe 27 is normally spaced a short distance above the rail 28, and the pull on the rod 3 will rotate the bell crank 6 counter-clockwise about its pivot, thus causing the roller 16 to press on the arcuate surface 17 of the vertical member 18, to the lower end of which the shoe 27 is attached. Downwards pressure on the arcuate surface 17 will press the member 18 vertically downward about the pivots 20 and 21 and the shoe 27 will be pressed into frictional engagement with the upper surface of the rail 28.

This frictional engagement will cause the member 18 to pivot in a counter-clockwise direction about the pivot 20, the upper end of the member 18 moving in the same direction as the movement of the vehicle, and the arcuate portion 17 moving under the roller 16 without reduction of the downward pressure on the member 18. This movement of the upper end of the member 18 will move the arm 30 to the left, causing the lever 31 to pivot in the same direction about its pivot 32. This, in turn, will pull the rod 48 to the left and will pivot the cam member 49 in the same direction to press its left hand cam surface against the web 39 of the pincer arm 37. Reaction of the pressure of the cam surface against the web 39 will exert a pull on the eye-bolt 44, and these two reactive forces will draw the pincer arms together to press the friction pads 43 against the opposite radial faces of the disc 35 with a force which is directly proportional to the co-efficient of friction existing between the shoe 27 and the rail 28, which latter controls the extent of angular movement of the member 18. The amount of this friction between the rail and the shoe will depend upon the speed and weight of the vehicle, and the amount of vertically-downward pressure applied to the member 18 by the vacuum cylinder. This will, at the same time, be further subject to the frictional conditions existing between the shoe and the rail, so that if the rails are wet or greasy or otherwise in a condition wherein adhesion between the wheels and rails is of such an order that skidding might occur, a similar condition will exist between the shoe and the rail and the force of the brake application will be reduced by the smaller angular movement of the member 18. Thus, by appropriate correlation of the mechanical advantages provided in the bell cranks 1 and 6, vertical member 18 and arm 31, the braking system can be readily adapted to provide non-skid braking for different types and weight of vehicle.

Upon release of the vacuum means 12, the spring 23 draws the shoe 27 away from the rail 28 and the brake is automatically released. If desired, a helical compression spring may be placed in compression on the eye-bolt 44 between the webs 39 of the arms 37, 38 to provide positive retraction of the friction pads 43 clear of the disc 35 when the brake is released. This is by no means essential, and it is normally preferred not to provide positive retraction means, as light rubbing contact between the friction pads 43 and the disc 35 is of no disadvantage and is often preferred for the reason that this helps to keep the disc dry and dust-free and in a suitable condition for immediate full torque-absorbing response whenever required.

If the vehicle is travelling to the right, as in the drawing, contact of the shoe 27 with the rail 28 will rotate the member 18 in a clockwise direction, pulling the arm 30 and lever 31 to the right and causing the rod 48 to push the cam member 49 to the right to press the right hand cam surface against the web 39 of the arm 37. Other than in this regard, operation of the brake is the same in either direction of travel of the vehicle.

In the present invention the degree of application of the brake is subject to variations in the amount of friction existing between the rail and the shoe so that a non-locking brake may be provided to suit substantially all load, speed and rail/wheel adhesion conditions.

Although the invention has been described in association with vacuum-operated brake-actuating mechanism of the known type, it is not confined to such vacuum operation, as it may readily be adapted to operation by fluid pressure, electrical or mechanical means of known types within the skill of the craftsman practised in the art.

Having now described my invention, what I claim is:

1. A braking system for a railway vehicle having the wheels thereof adapted to engage with and to rotate upon a metal rail, said system comprising a braking member rotatable in association with said wheel, a friction member non-rotatably associated with a non-rotatable portion of said vehicle and adapted to be forced into frictional engagement with said braking member, a vertical arm, means pivoting said arm to a non-rotatable portion of said vehicle for vertical and angular movement relative to said non-rotatable portion in a vertical plane extending in the direction of travel of said vehicle, resilient means normally urging said vertical arm away from said metal rail, friction means secured to the lower end of said vertical arm, brake-operating means operable to cause vertical movement of said vertical arm against said resilient means towards said rail to bring the friction means secured thereto into frictional engagement with said rail and thereby to cause said arm to move angularly in the direction of rotation of said wheel, and means responsive to said pivoting of said vertical arm to force said friction member into frictional engagement with said braking member.

2. A braking system according to claim 1 wherein said friction means comprises a metal shoe.

3. A braking system according to claim 2 wherein said means to force said shoe into frictional engagement with said rail comprise a piston and cylinder mechanism, movement of said piston in a brake-applying direction being adapted to cause said vertical movement of said vertical arm in a vertically-downward direction.

4. A braking system according to claim 2 wherein said pivot on said vertical arm is located intermediate the ends thereof, said angular movement responsive to said frictional engagement between said shoe and said rail being adapted to cause said frictional engagement of said friction member with said braking member in either direction of said angular movement.

5. A braking system according to claim 4 wherein the means to cause vertical movement of said vertical arm comprise a bell-crank lever, a roller rotatable in one arm thereof adapted to be pressed vertically into engagement with an arcuate surface on said vertical arm, whereby said movable member is adapted to move angularly in either direction without reduction of the initial pressure applied by said bell-crank lever in a vertically-downward direction.

6. A braking system according to claim 1 wherein said means responsive to said pivoting of said vertical arm comprise a link having one end pivoted in the upper end of said vertical arm and the other end associated with said friction member whereby said angular movement of said vertical arm in either direction forces said friction member against said braking member.

7. A braking system according to claim 6 wherein said braking member comprises a disc secured to, and rotatable with, a live axle secured to a wheel of said vehicle and said friction member comprises a pair of pincer arms pivotally secured to said non-rotatable portion of said vehicle each said arm having one of its ends extending radially-inwardly of the external periphery of said disc, one adjacent each radial side thereof, a pad of friction material secured to each said arm and lying between said arm and the adjacent radial side of said disc, and means connected to said link and adapted to draw said arms together to force said friction pads into frictional engagement with the opposite radial faces of said disc upon angular movement of said vertical arm in either direction.

8. A braking system according to claim 7 wherein the means connected to said link comprise a cam member having one end associated with said link and having opposed cam surfaces at its other end adapted to engage a vertical surface of one of said pincer arms, an eye-bolt having its eye portion pivoted to the end of said cam member adjacent said cam surfaces, the shank of said bolt passing loosely through a hole in said one pincer arm and being secured in a co-axial hole in the other said pincer arm, whereby actuation of said link in either direction is adapted to cause one of said opposed cam surfaces to engage said vertical surface and, through reaction on said eye bolt, to move said pincer arms together.

References Cited in the file of this patent

UNITED STATES PATENTS

| | | |
|---|---|---|
| 798,891 | Eiesenkramer | Sept. 5, 1905 |
| 830,476 | Fenstermaker | Sept. 4, 1906 |
| 1,153,151 | Boch | Sept. 7, 1915 |
| 1,622,475 | Thomas | Mar. 29, 1927 |
| 2,621,760 | Reader | Dec. 16, 1952 |
| 2,751,046 | Tack | June 19, 1956 |

FOREIGN PATENTS

| | | |
|---|---|---|
| 373,918 | Germany | Apr. 17, 1923 |